(12) United States Patent
Doi et al.

(10) Patent No.: US 7,069,054 B2
(45) Date of Patent: Jun. 27, 2006

(54) RADIO DEVICE

(75) Inventors: Yoshiharu Doi, Gifu (JP); Jun Kitakado, Hashima (JP); Masashi Iwami, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 664 days.

(21) Appl. No.: 10/363,255

(22) PCT Filed: Aug. 22, 2001

(86) PCT No.: PCT/JP01/07193

§ 371 (c)(1),
(2), (4) Date: Mar. 7, 2003

(87) PCT Pub. No.: WO02/21724

PCT Pub. Date: Mar. 14, 2002

(65) Prior Publication Data

US 2003/0171134 A1 Sep. 11, 2003

(30) Foreign Application Priority Data

Sep. 8, 2000 (JP) .............................. 2000-272923

(51) Int. Cl.
*H04M 1/00* (2006.01)

(52) U.S. Cl. ................... 455/562.1; 455/63.4

(58) Field of Classification Search ............. 455/562.1, 455/63.4, 63.1, 277.1, 272; 375/267; 342/378
See application file for complete search history.

(56) References Cited

U.S. PATENT DOCUMENTS 6,061,553 A * 5/2000 Matsuoka et al. .......... 455/273
6,590,532 B1 * 7/2003 Ogawa et al. .............. 342/378
6,714,584 B1 * 3/2004 Ishii et al. .................. 375/148
6,931,244 B1 * 8/2005 Kitakado et al. ........ 455/277.1
2002/0032015 A1 * 3/2002 Kitakado et al. ........ 455/277.1
2004/0048581 A1 * 3/2004 Miyata et al. ................ 455/73
2004/0176136 A1 * 9/2004 Doi et al. ................. 455/562.1

(Continued)

FOREIGN PATENT DOCUMENTS

JP          11-205286          7/1999

OTHER PUBLICATIONS

B. Widrow et al.; Proceedings of the IEEE, vol. 55, No. 12, pp. 2143-2159, Dec. 1967. Discussed in the specification.

(Continued)

*Primary Examiner*—Lee Nguyen
*Assistant Examiner*—Lewis West
(74) *Attorney, Agent, or Firm*—Westerman, Hattori, Daniels & Adrian, LLP.

(57) ABSTRACT

A first reception circuit (SR1) separates a signal from a desired terminal among signals from an adaptive array antenna (#1 to #4), based on a reception weight vector calculated in a reception weight vector calculator (20.1). A remodulation circuit (32.1) generates a first replica signal from a signal of a demodulated desired wave. A replica generating circuit (40.1) multiplies signals from a plurality of antennas by a weight vector for an interfering wave from a second reception circuit (SR2), and generates a second replica signal corresponding to a signal from an interfering wave terminal. A reception response vector calculator (24.1) derives an impulse response of a propagation path of the signal from the desired terminal, based on the first and second replica signals.

8 Claims, 10 Drawing Sheets

U.S. PATENT DOCUMENTS

2005/0085192 A1* 4/2005 Iwami et al. ............ 455/67.16

OTHER PUBLICATIONS

S. P. Applebaum, IEEE Transactions on Antennas and Propagation, vol. AP-24, No. 5, pp. 585-598, Sep. 1976. Discussed in the specification.

H. Suzuki et al.; Technical Report of IEICE, RCS93-84, pp. 37-44. Discussed in the specification.

S. C. Swales et al.; IEEE Transactions on Vehicular Technology, vol. 39, No. 1, pp. 56-67, Feb. 1990. Discussed in the specification.

T. Ohgane et al.; IEEE 1997, vol. 2, pp. 725-729, May 1997. Discussed in the specification.

Y. Katoh et al.; IEICE Transactions B-II, vol. J81-B-II, No. 1, pp. 1-9, Jan. 1998. Discussed in the specification.

Y. Doi et al.; Technical Report of IEICE, RCS97-68 pp. 27-32, (Jul. 1997). Discussed in the specification.

* cited by examiner

FIG. 9 PRIOR ART

| 1 | 0 | ... | 1 | 0 | 1 | ... | 0 | 1 |
|---|---|---|---|---|---|---|---|---|
| PREAMBLE SIGNAL SEQUENCE ALREADY KNOWN TO RADIO BASE STATION ||||| DATA (SUCH AS VOICE DATA) SIGNAL SEQUENCE UNKNOWN TO RADIO BASE STATION ||||

RADIO DEVICE

TECHNICAL FIELD

The present invention relates to a configuration of a radio apparatus in which antenna directivity can be varied in real time, and more particularly, to a configuration of a radio apparatus used in an adaptive array radio base station.

BACKGROUND ART

In recent years, in a mobile communication system, a variety of methods for allocating transmission channels have been proposed for efficient use of frequencies, of which some have been put into practical use.

FIG. 6 shows channel arrangements in a variety of communication systems: Frequency Division Multiple Access (FDMA), Time Division Multiple Access (TDMA), and Path Division Multiple Access (PDMA).

First, referring to FIG. 6, brief description of FDMA, TDMA and PDMA will be provided. FIG. 6($a$) shows FDMA, in which analog signals of users 1 to 4 are transmitted in a frequency-divided manner with radio waves of different frequencies f1 to f4, and the signals of respective users 1 to 4 are separated by frequency filters.

In TDMA shown in FIG. 6($b$), digitized signals of respective users are transmitted in a time-divided manner at a certain time period (time slot) with radio waves of different frequencies f1 to f4. The signals of respective users are separated by frequency filters and time synchronization between a base station and respective user mobile terminals.

Meanwhile, a PDMA system has recently been proposed in order to improve the efficiency of the use of radio wave frequencies as mobile phones have widely been used. As shown in FIG. 6($c$), in the PDMA system, one time slot in the same frequency is spatially divided, and data of a plurality of users are transmitted. In the PDMA system, signals of respective users are separated, using frequency filters, time synchronization between the base station and respective user mobile terminals, and a mutual interference eliminator such as an adaptive array.

An operation principle of such an adaptive array radio base station is well-known, as described in the references below.

B. Widrow, et al. : "Adaptive Antenna Systems," Proc. IEEE, vol. 55, No. 12, pp.2143–2159 (December 1967).

S. P. Applebaum: "Adaptive Arrays", IEEE Trans. Antennas & Propag., vol. AP-24, No. 5, pp.585–598 (September 1976).

FIG. 7 is a schematic diagram conceptually showing the operation principle of such an adaptive array radio base station. In FIG. 7, one adaptive array radio base station 1 includes an array antenna 2 consisting of n antennas #1, #2, #3, . . . , #n, of which coverage is shown with a first hatched region 3. On the other hand, coverage of adjacent, another radio base station 6 is shown with a second hatched region 7.

In region 3, a radio wave signal is communicated between a mobile phone 4, which is a terminal for a user A, and adaptive array radio base station 1 (arrow 5). Meanwhile, in region 7, another radio wave signal is communicated between a mobile phone 8, which is a terminal for another user B, and radio base station 6 (arrow 9).

Here, if the frequency of the radio wave signal of mobile phone 4 for user A is by chance equal to that of mobile phone 8 for user B, the radio wave signal from mobile phone 8 for user B may be an unnecessary, interfering signal within region 3, depending on a position of user B, and it may cross with the radio wave signal between mobile phone 4 for user A and adaptive array radio base station 1.

As described above, adaptive array radio base station 1 that has received the crossed radio wave signals from both users A and B will output a crossed signal, unless the signal is subjected to some kind of processing. In such a case, communication of user A, that should originally be established, will be prevented.

[Configuration and Operation of Conventional Adaptive Array Antenna]

In order to eliminate the signal from user B from an output signal, adaptive array radio base station 1 carries out a processing in the following. FIG. 8 is a schematic block diagram showing a configuration of adaptive array radio base station 1.

Initially, the signal from user A is represented as A(t), and the signal from user B is represented as B(t). Then, a reception signal x1(t) at the first antenna #1 constituting array antenna 2 in FIG. 7 is expressed as follows.

$$x1(t)=a1\times A(t)+b1\times B(t)$$

Here, a1 and b1 are coefficients which vary in real time, as described later.

Similarly, a reception signal xn(t) at the nth antenna #n is expressed as follows.

$$xn(t)=an\times A(t)+bn\times B(t)$$

Here, an and bn are also coefficients that vary in real time.

The aforementioned coefficients, a1, a2, a3, . . . , an indicate that there will be differences in reception intensity at respective antennas. This is because relative positions of antennas #1, #2, #3, . . . , #n constituting array antenna 2 are different with respect to the radio wave signal from user A respectively (for example, each antenna is arranged with a space from one another by a distance of 5 times of a wavelength of the radio wave signal, that is, approximately 1 meter).

In addition, similarly, coefficients b1, b2, b3, . . . , bn indicate that there will be differences in reception intensity at respective antennas #1, #2, #3, . . . , #n, with respect to the radio wave signal from user B. Since each user travels, these coefficients vary in real time.

Signals x1(t), x2(t), x3(t), . . . , xn(t) received by respective antennas enter a reception portion 1R constituting adaptive array radio base station 1 via corresponding switches 10-1, 10-2, 10-3, . . . , 10-n, and are provided to a weight vector control portion 11 as well as to one inputs of corresponding multipliers 12-1, 12-2, 12-3, . . . , 12-n.

Weights w1, w2, w3, . . . , wn with respect to the reception signals at respective antennas are applied to the other inputs of these multipliers from weight vector control portion 11. These weights are calculated in real time by weight vector control portion 11, as described below.

Therefore, reception signal x1(t) at antenna #1 will be w1×(a1A(t)+b1B(t)) through multiplier 12-1, reception signal x2(t) at antenna #2 will be w2×(a2A(t)+b2B(t)) through multiplier 12-2, reception signal x3(t) at antenna #3 will be w3×(a3A(t)+b3B(t)) through multiplier 12-3, and further, reception signal xn(t) at antenna #n will be wn×(anA(t)+bnB(t)) through multiplier 12-n.

Outputs of multipliers 12-1, 12-2, 12-3, . . . , 12-n are added in an adder 13, of which output is represented as follows.

$$w1(a1A(t)+b1B(t))+w2(a2A(t)+b2B(t))+w3(a3A(t)+b3B(t))+\ldots+wn(anA(t)+bnB(t))$$

When this representation is divided into two terms, that is, a term relating to signal A(t) and a term relating to signal B(t), the following representation can be obtained.

$$(w1a1+w2a2+w3a3+\ldots+wnan)A(t)+(w1b1+w2b2+w3b3+\ldots+wnbn)B(t)$$

Here, adaptive array radio base station 1 distinguishes between users A and B, and calculates the above weights w1, w2, w3, . . . , wn so as to extract only the signal from a desired user, as described below. For example, in an example of FIG. 8, weight vector control portion 11 regards coefficients a1, a2, a3, . . . , an, b1, b2, b3, . . . , bn as constants, in order to extract only signal A(t) from user A with which communication is to be established. Further, weight vector control portion 11 calculates weights w1, w2, w3, . . . , wn such that coefficients for signal A(t) attain 1 as a whole, and coefficients for signal B(t) attain 0 as a whole.

In other words, weight vector control portion 11 calculates, in real time, such weights w1, w2, w3, . . . , wn that coefficient of signal A(t) attains 1 and coefficient of signal B(t) attains 0, by solving simultaneous simple equations below.

$$w1a1+w2a2+w3a3+\ldots+wnan=1$$

$$w1b1+w2b2+w3b3+\ldots+wnbn=0$$

Though description for how to solve these simultaneous simple equations will not be provided, it is well known as described in the aforementioned references, and has already been put into practical use in the adaptive array radio base station.

By setting weights w1, w2, w3, . . . , wn as described above, an output signal of adder 13 will be given as shown below.

$$\text{Output signal}=1\times A(t)+0\times B(t)=A(t)$$

[User Identification and Training Signal]

It is to be noted that users A and B above are distinguished in the following manner.

FIG. 9 is a schematic diagram showing a frame configuration of a radio wave signal of a portable phone. The radio wave signal of the mobile phone is mainly composed of a preamble consisting of a signal sequence already known to the radio base station, and data (such as voice data) consisting of a signal sequence unknown to the same.

The signal sequence of the preamble includes those of information determining whether or not the user is a desired user with which the radio base station should communicate. Weight vector control portion 11 (FIG. 8) in adaptive array radio base station 1 compares a training signal corresponding to user A, taken out from a memory 14, with the received signal sequence, and controls the weight vector (determines weights) so as to extract a signal that appears to include the signal sequence corresponding to user A. The signal of user A thus extracted is output to the outside from adaptive array radio base station 1 as an output signal $S_{RX}(t)$.

On the other hand, in FIG. 8, an external input signal $S_{TX}(t)$ enters a transmission portion 1T constituting adaptive array radio base station 1, and is provided to one inputs of multipliers 15-1, 15-2, 15-3, . . . , 15-n. Weights w1, w2, w3, . . . , wn previously calculated based on the reception signal by weight vector control portion 11 are copied and applied to the other inputs of these multipliers respectively.

The input signals weighted by these multipliers are sent to corresponding antennas #1, #2, #3, . . . , #n via corresponding switches 10-1, 10-2, 10-3, . . . , 10-n, and transmitted to region 3 in FIG. 7.

Here, the signal to be transmitted with the same array antenna 2 as used in reception is weighted, also targeted for user A as the reception signal. Therefore, the transmitted radio wave signal is received by mobile phone 4 for user A as if it has directivity toward user A.

FIG. 10 visualizes such communication of the radio wave signal between user A and adaptive array radio base station 1. In contrast to region 3 in FIG. 7 showing an area which the radio wave can actually reach, a state in which the radio wave signal is emitted with directivity, targeted for mobile phone 4 for user A, from adaptive array radio base station 1 is imaged, as shown in a virtual region 3a of FIG. 10.

In the PHS, which is a digital mobile communication system, the adaptive array as described above has already been put into practical use, and implementation of the PDMA system which can accommodate a larger number of users has been discussed. Such a PDMA system is disclosed in the following references.

(1) Suzuki, Hirade, IEICE Technical Report, vol. RCS93-84, pp.37–44, January 1994

(2) S. C. Swales, M. A. Beach, D. J. Edwards, J. P. McGeehan, IEEE Trans. Veh. Technol., vol. 39, pp.56–67, Febuary 1990

(3) T. Ohgane, Y. Ogawa, and K. Itoh, Proc. VTC '97, vol. 2, pp.725–729, May 1997

As described above, in the PDMA system (Path Division Multiple Access) using the adaptive array, an identical channel can be allocated to a plurality of users in the same cell by adaptively directing null of array antenna directivity to an interfering user, so long as an optimal weight vector is calculated.

Thus, in the PDMA system, a technique to eliminate interference in the identical channel is required. In this regard, the adaptive array adaptively directing null to an interfering wave is effective, because the interfering wave can effectively be suppressed even if the level of the interfering wave is higher than that of a desired wave.

When the adaptive array is used in the base station, unnecessary emission in transmission can also be reduced, in addition to eliminating interference in reception.

Here, for an array pattern in transmission, an array pattern in reception may be used, or alternatively, a new array pattern may be generated from a result of estimate of an incoming direction and the like. The latter method is applicable, regardless of FDD (Frequency Division Duplex) or TDD (Time Division Duplex), however, a complicated processing will be necessary. On the other hand, when the former method is used for FDD, correction for array arrangement, weight or the like will be needed, because array patterns are different in transmission and reception. Therefore, application for TDD is generally assumed, and satisfactory property has been obtained in an environment where external slots are continuous.

As described above, in the TDD/PDMA system using the adaptive array in the base station, when an array pattern (a weight vector pattern) obtained in an uplink is used for a downlink, and if a dynamic Raleigh propagation path with spread angle is assumed, an error rate may be deteriorated in the downlink due to a time difference between the uplink and the downlink.

In other words, there is an interval from a time point when the radio wave is transmitted from a user terminal to the base station through the uplink to a time point when the radio wave is emitted from the base station to the user terminal through the downlink. Therefore, an error between the emitted direction of the radio wave from the base station and a direction in which the user terminal is actually present will deteriorate the error rate, when a traveling speed of the user terminal is not negligible.

As a method for estimating a weight for the downlink taking into account fluctuation of such a propagation path, a technique of first order extrapolation using a weight vector value obtained in the uplink has been proposed in the following references.

(1) Katoh, Ohgane, Ogawa, Itoh, IEICE Trans., vol. J81-B-II, no. 1, pp. 1–9, January 1998.

(2) Doi, Ohgane, Karasawa, IEICE Technical Report, RCS97-68, pp.27–32, July 1997.

When change over time in the weight is actually observed, however, it is not linear, and the error tends to be large with the conventional technique of the first order extrapolation of the weight vector.

In addition, in estimating the weight in transmission, it is also necessary to enable processing with a practical circuit scale.

DISCLOSURE OF THE INVENTION

An object of the present invention is to provide a radio apparatus which can achieve, with a practical circuit scale, suppression of deterioration of an error rate in a downlink caused by a time difference between an uplink and the downlink in a TDD/PDMA system by indirectly estimating a weight by estimating fluctuation over time of a response vector.

In order to attain such an object, a radio apparatus according to the present invention varies antenna directivity in real time, and transmits and receives signals to and from a plurality of terminals. The radio apparatus includes a plurality of antennas, a first reception circuit, and a second reception circuit.

The plurality of antennas are arranged in a discrete manner. The first reception circuit receives signals from the plurality of antennas, and separates a signal from a first terminal among the signals from the plurality of terminals. The second reception circuit receives signals from the plurality of antennas, and separates a signal from a second terminal among the signals from the plurality of terminals.

The first reception circuit i) separates the signal from the first terminal, based on the signals from the plurality of antennas in receiving a reception signal, ii) generates a first replica signal based on the separated signal from the first terminal, and calculates a first reception correlation vector with respect to the signal from the first terminal in accordance with the first replica signal and the signals from the plurality of antennas in receiving the reception signal, iii) generates a second replica signal corresponding to the signal from the second terminal with the signals from the plurality of antennas, based on separation control information for separating the signal from the second terminal in the second reception circuit in receiving the reception signal, and iv) estimates a reception response vector with respect to the signal from the first terminal, based on a second reception correlation vector with respect to the signal from the second terminal, the first reception correlation vector, and a correlation matrix calculated from the first and second replica signals.

According to yet another aspect of the present invention, a radio apparatus varies antenna directivity in real time, and transmits and receives signals to and from a plurality of terminals. The radio apparatus includes a plurality of antennas, a first reception circuit, and a second reception circuit.

The plurality of antennas are arranged in a discrete manner. The first reception circuit receives signals from the plurality of antennas, and separates a signal from a first terminal among the signals from the plurality of terminals. The second reception circuit receives signals from the plurality of antennas, and separates a signal from a second terminal among the signals from the plurality of terminals.

The first reception circuit includes a first reception signal separation circuit, a first reception correlation vector calculation circuit, a first replica signal generating circuit, and a reception response vector calculation circuit.

The first reception signal separation circuit generates a first weight vector based on the signals from the plurality of antennas and separates the signal from the first terminal in receiving the reception signal. The first reception correlation vector calculation circuit calculates, in receiving the reception signal, a first reception correlation vector with respect to the signal from the first terminal, in accordance with a first replica signal, generated based on an output of the first reception signal separation circuit, and the signals from the plurality of antennas. The first replica signal generating circuit generates a second replica signal corresponding to the signal from the second terminal, based on separation control information in the second reception circuit, with respect to the signals from the plurality of antennas in receiving the reception signal. The reception response vector calculation circuit estimates a reception response vector with respect to the signal from the first terminal, based on a second reception correlation vector with respect to the signal from the second terminal provided from the second reception circuit, the first reception correlation vector, and a correlation matrix calculated from the first and second replica signals.

Thus, according to the present invention, fluctuation over time of the reception response vector of the adaptive array can be estimated with a simple circuit configuration.

In addition, another advantage of the present invention is that deterioration with regard to the error rate in the downlink caused by the time difference between the uplink and the downlink can be suppressed also in the dynamic Raleigh propagation path with spread angle or the like, by indirectly estimating fluctuation of the weight by estimating fluctuation over time of the reception response vector of the adaptive array.

BRIEF DESCRIPTION OF THE DRAWINGS

FIG. 9 is a schematic diagram showing a frame configuration of a radio wave signal of a mobile phone.

BEST MODE FOR CARRYING OUT THE INVENTION

In the following, embodiments of the present invention will be described with reference to the drawings.

(Configuration in Which Replica Signal of Interfering Wave is Generated from Demodulated Signal of Received Interfering Wave)

Figure 1:
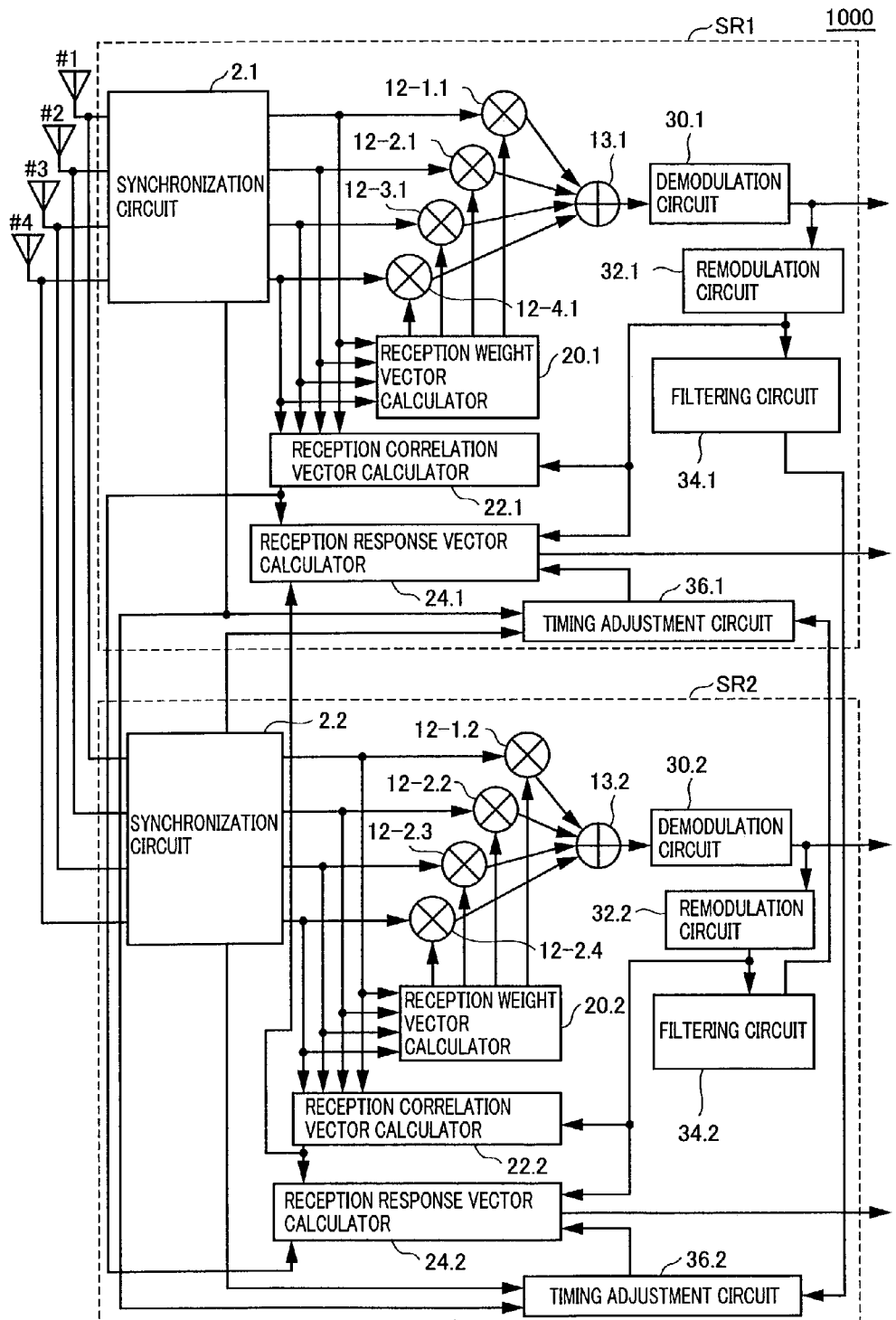
FIG. 1 is a schematic block diagram showing a configuration of radio apparatus (radio base station) 1000.

FIG. 1 is a schematic block diagram showing a configuration of a radio apparatus (a radio base station) 1000 in a PDMA base station, estimating a weight in transmission by estimating fluctuation over time of a response vector.

As described below, in radio apparatus 1000 shown in FIG. 1, attention is paid to the fact that the weight of the adaptive array can uniquely be represented with the response vector in each antenna element. The radio apparatus 1000 aims to suppress deterioration with regard to the error rate in the downlink caused by the time difference between the uplink and the downlink also in the TDD/PDMA system, by indirectly estimating the weight by estimating fluctuation over time of the response vector, when the dynamic Raleigh propagation path with spread angle or the like is assumed.

In the configuration shown in FIG. 1, in order to distinguish between users PS1 and PS2, for example, four antennas 1 to #4 are provided.

It is to be noted that, more generally, the number of antennas may be L (L is a natural number). For the sake of simplicity, two users are assumed here. The present invention, however, is not limited to such an example, and three or more users are possible. Further, in the configuration shown in FIG. 1, for the sake of simplicity, only a configuration of a portion related to signal reception is extracted for illustration. Therefore, the configuration of a transmission portion which is usually provided as in the configuration of a conventional adaptive array will not be illustrated.

Radio apparatus 1000 shown in FIG. 1 includes a reception portion SR1 for separating a signal from corresponding user PS1 and a reception portion SR2 for separating a signal from corresponding user PS2, upon receiving signals from antennas #1 to #4.

When reception signals x1(t), x2(t), x3(t), x4(t) received at respective antennas enter reception portion SR1, they are first provided to a synchronization circuit 2.1. After an incoming timing of the signal from user PS1 is detected, those signals are further provided to a reception weight vector calculator 20.1 and a reception correlation vector calculator 22.1, as well as to one inputs of corresponding multipliers 12-1.1, 12-2.1, 12-3.1, 12-4.1 respectively.

Weight coefficients wrx11, wrx21, wrx31, wrx41 with respect to the reception signals at respective antennas are applied to the other inputs of these multipliers from reception weight vector calculator 20.1. These weight coefficients are calculated in real time by reception weight vector calculator 20.1 as in the conventional example.

Reception portion SR1 further includes an adder 13.1 receiving and adding outputs of multipliers 12-1.1 to 12-4.1, a demodulation circuit 30.1 receiving and demodulating an output of adder 13.1, and extracting a baseband signal, a remodulation circuit 32.1 receiving and remodulating an output of demodulation circuit 30.1, and generating a replica signal of the reception signal from user PS1, and a filtering circuit 34.1 receiving an output of remodulation circuit 32.1 and shaping a waveform. An output of filtering circuit 34.1 is provided to a timing adjustment circuit 36.2 in reception portion SR2.

Reception portion SR1 further includes a reception correlation vector calculator 22.1 receiving reception signals x1(t) to x4(t) from synchronization circuit 2.1 and an output of remodulation circuit 32.1, and calculating a reception correlation vector with respect to the signal from user PS1 in accordance with a procedure described below; and a reception response vector calculator 24.1 for calculating a reception response vector with respect to the reception signal from user PS1, based on a replica signal of the signal from user PS2 obtained after adjusting a difference in incoming timings of the reception signals of users PS1 and PS2 further in timing adjustment circuit 36.1 with respect to an output from filtering circuit 34.2, an output of reception correlation vector calculator 22.1, and a replica signal of the signal from user PS1, which is the output of remodulation circuit 32.1.

Timing adjustment circuit 36.1 provides the replica signal of the signal from user PS2 to reception response vector calculator 24.1, after adjusting the difference in the incoming timings of the reception signals of users PS1 and PS2 with respect to the signal provided from filtering circuit 34.2 to timing adjustment circuit 36.1, in accordance with a detection result of the incoming timings of the reception signals of synchronization circuit 2.1 in reception portion SR1 and a synchronization circuit 2.2 in reception portion SR2.

A similar configuration is provided also for reception portion SR2.

The reason for shaping the waveform of the output from remodulation circuit 32.2 through filtering circuit 34.2 is as follows. The incoming timings of the signals from users PS1 and PS2 are generally different. Therefore, in calculating the reception response vector in reception response vector calculator 24.1, a sampling timing of the reception signal from user PS1 in reception portion SR1 is different from that from user PS2 in reception portion SR2. Consequently, it is necessary to use an interpolated signal level between sampling timings at the output of remodulation circuit 32.2 in reception portion SR2.

As described below, by estimating fluctuation over time of the response vector from the reception response vector of user PS1 thus calculated, the weight in transmission can indirectly be estimated.

[Operation Principle as Adaptive Array]

Initially, an operation of reception portion SR1 will briefly be described in the following.

Reception signals x1(t), x2(t), x3(t), x4(t) received by the antenna are expressed with equations below.

$$x1(t) = h_{11} Srx_1(t) + h_{12} Srx_2(t) + n_1(t) \quad (1)$$

$$x2(t) = h_{21} Srx_1(t) + h_{22} Srx_2(t) + n_2(t) \quad (2)$$

$$x3(t) = h_{31} Srx_1(t) + h_{32} Srx_2(t) + n_3(t) \quad (3)$$

$$x4(t) = h_{41} Srx_1(t) + h_{42} Srx_2(t) + n_4(t) \quad (4)$$

Here, a signal xj(t) represents the reception signal of the jth(=1, 2, 3, 4) antenna, and a signal $Srx_i(t)$ represents a signal transmitted by the ith (i=1, 2) user.

Further, a coefficient hji represents a complex coefficient of the signal from the ith user received by the jth antenna, and nj(t) represents noise contained in the jth reception signal.

Equations (1) to (4) in the above are expressed in a vector format as below.

$$X(t)=H_1 Srx_1(t)+H_2 Srx_2(t)+N(t) \quad (5)$$

$$X(t)=[x1(t), x2(t), \ldots, x4(t)]^T \quad (6)$$

$$H_i=[h_{1i}, h_{2i}, \ldots, h_{4i}]^T, (i=1, 2) \quad (7)$$

$$N(t)=[n_1(t), n_2(t), \ldots, n_4(t)]^T \quad (8)$$

It is to be noted that $[\ldots]^T$ represents transpose of $[\ldots]$ in equations (6) to (8).

Here, X(t) represents an input signal vector, $H_i$ represents the reception response vector of the ith user, and N(t) represents a noise vector, respectively.

As shown in FIG. 1, a signal synthesized by multiplying the input signals from respective antennas by weight coefficients wrx1i to wrx4i is output as reception signal Srxi(t).

After such preparation, for example, the adaptive array operates in a following manner, when extracting signal Srx1(t) transmitted by the first user.

An output signal y1(t) of an adaptive array 100 can be expressed with the following equations, by multiplying input signal vector X(t) by a weight vector W1.

$$y1(t)=X(t)W_1^T \quad (9)$$

$$W_1=[wrx_{11}, wrx_{21}, wrx_{31}, wrx_{41}]^T \quad (10)$$

In other words, weight vector W1 is a vector having, as an element, weight coefficient wrxj1 (=1, 2, 3, 4) multiplied by jth input signal RXj(t).

Here, when input signal vector X(t) expressed with equation (5) is substituted in equation (9) representing y1(t), a relation in the following is obtained.

$$y1(t)=H_1 W_1^T Srx_1(t)+H_2 W_1^T Srx_2(t)+N(t)W_1^T \quad (11)$$

If the adaptive array operates in an ideal manner, weight vector W1 is sequentially controlled with a well known technique by weight vector calculator 20.1, so as to satisfy the following simultaneous equations.

$$H_1 W_1^T=1 \quad (12)$$

$$H_2 W_1^T=0 \quad (13)$$

When weight vector W1 is completely controlled so as to satisfy equations (12) and (13), output signal y1(t) from adaptive array 1000 will eventually be expressed with the following equations.

$$y1(t)=Srx_1(t)+N_1(t) \quad (14)$$

$$N_1(t)=n_1(t)w_{11}+n_2(t)w_{21}+n_3(t)w_{31}+n_4(t)w_{41} \quad (15)$$

In other words, signal Srx1(t) transmitted by the first user out of two users is obtained as output signal y1(t).

[Overview of Operation of Radio Apparatus 1000]

Figure 2:
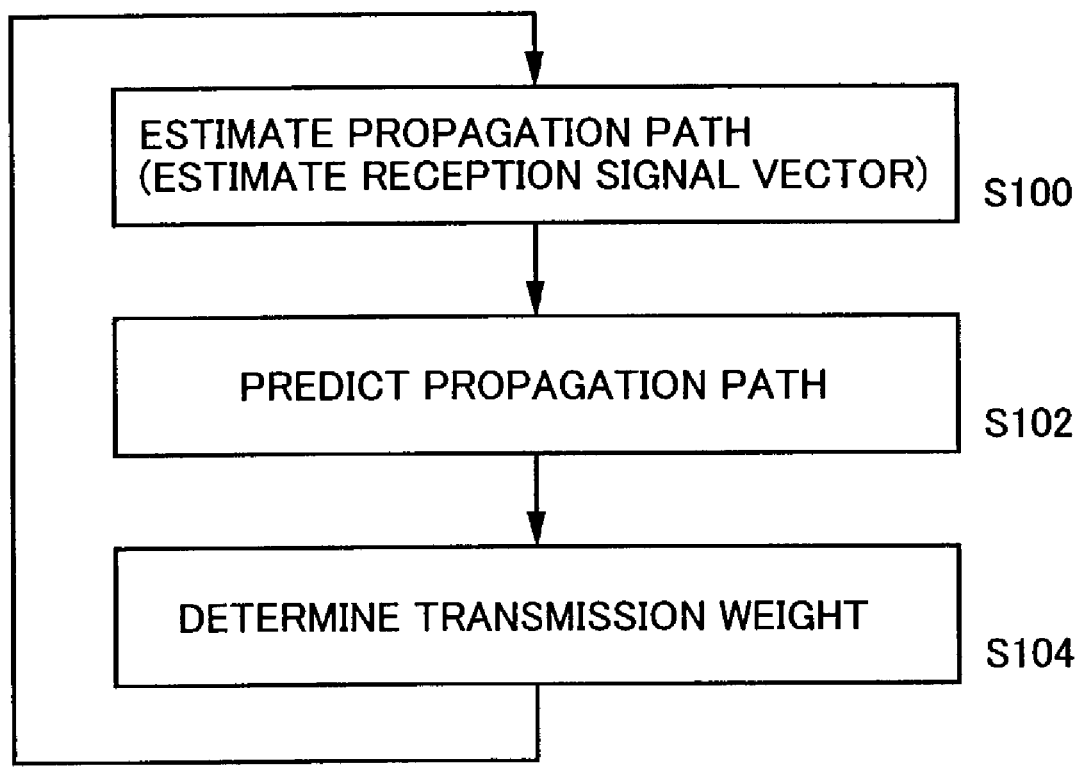
FIG. 2 is a flowchart illustrating an overview of an operation of radio apparatus 1000.

FIG. 2 is a flowchart illustrating an overview of an operation of radio apparatus 1000.

In radio apparatus 1000, attention is paid to the fact that the weight vector (weight coefficient vector) of the adaptive array can uniquely be represented with the reception response vector in each antenna element. The weight is indirectly estimated by estimating fluctuation over time of the reception response vector.

First, in reception portion SR1, the propagation path of the reception signal is estimated based on the reception signal (step S100). Estimation of the propagation path is comparable to obtaining an impulse response of the signal transmitted from the user in equations (1) to (4).

Stated differently, in equations (1) to (4), if a reception response vector $H_1$ can be estimated, for example, the propagation path in receiving the signal from user PS1 can be estimated.

Succeedingly, in the transmission portion, the propagation path in transmission, that is, the reception response vector at a time point of transmission is predicted from the reception response vector in reception (step S102). The predicted reception response vector is comparable to a transmission coefficient vector in transmission. In addition, in the transmission portion, a transmission weight vector is calculated based on the predicted transmission coefficient vector, and the weight in transmission is controlled (step S104).

[Operation of Reception Response Vector Calculator 24.1]

Next, an operation of reception response vector calculator 24.1 in a first embodiment shown in FIG. 1 will be described.

First, four antenna elements and two users in simultaneous communication are assumed. Then, the reception signals at time t from the antennas are represented as x1(t), x2(t), x3(t), x4(t) respectively, the replica signal of the desired wave (radio wave from user PS1) is represented as D(t), and the replica signal of the interfering wave (radio wave from user PS2) is represented as U(t−T2). Here, a reception response vector HD of the desired wave is estimated. It is to be noted that T2 represents a difference in the incoming time between the desired wave and the interfering wave.

Reception signal vector X(t) is expressed with the following equations.

$$x1(t)=h11D(t)+h12U(t-T2)+n1(t)$$

$$x2(t)=h21D(t)+h22U(t-T2)+n2(t)$$

$$x3(t)=h31D(t)+h32U(t-T2)+n3(t)$$

$$x4(t)=h41D(t)+h42U(t-T2)+n4(t)$$

$$X(t)=[x1(t), x2(t), x3(t), x4(t)]^T$$

$$H_D=[h11, h12, h13, h41]^T$$

Here, a coefficient r11 for replica signal D(t) for user PS1 and reception signal x1(t) among the elements of the reception correlation vector is represented in the following equation.

$$r11 = E[D*(t)x1(t)]$$
$$= h11\ E[D*(t)D(t)] + h12\ E[D*(t)U(t-T2)] + E[D*(t)n1(t)]$$

Here, ensemble average (time average) with regard to replica signal D(t) itself of the desired wave attains 1, while correlation of replica signal D(t) of the desired wave with noise signal n1(t) attains 0, if the time for taking an average is sufficiently long. Therefore, following equations are established.

$$E[D*(t)D(t)]=1$$

$$E[D*(t)n1(t)]=0$$

Among the elements of the reception correlation vector, respective coefficients r21, r31, r41 for replica signal D(t) for user PS1 and other reception signals x2(t) to x4(t) can be calculated in a similar manner.

Therefore, each element of the reception correlation vector can eventually be obtained by the calculation in the following.

$$r11 = E[D^*(t)x1(t)] = h11 + h12 E[D^*(t)U(t-T2)]$$

$$r21 = E[D^*(t)x2(t)] = h21 + h22 E[D^*(t)U(t-T2)]$$

$$r31 = E[D^*(t)x3(t)] = h31 + h32 E[D^*(t)U(t-T2)]$$

$$r41 = E[D^*(t)x4(t)] = h41 + h42 E[D^*(t)U(t-T2)]$$

Here, if the signal from user PSI is completely orthogonal to that from user PS2, the following equation further holds.

$$E[D^*(t)U(t-T2)] = 0$$

In other words, if the signal from user PS 1 is completely orthogonal to that from user PS2, reception correlation vector [r11, r21, r31, r41] will correspond to reception response vector $H_D$ for user PS1.

In actual, however, it is impossible to allocate a code sequence such that the signal from user PS1 is completely orthogonal to that from user PS2. Therefore, a value for $E[D^*(t)U(t-T2)]$ should be estimated.

Reference below discloses that, by using an inverse matrix $R^{-1}$ of a correlation matrix R of users PS1 and PS2, and a correlation component of replica signal U(t–T2) of user PS2 with reception signal vector X(t), a component of an interfering user signal is eliminated, and the reception response vector of the desired wave can be estimated: Yoshihisa Kishiyama, Takeo Ohgane, Toshihiko Nishimura, Yasutaka Ogawa, Yoshiharu Doi, "Discussion of Method for Estimating Weight for Downlink in TDD/SDMA System Using Adaptive Array," Technical Report of IEICE, cs99-44, RCS99-36 (1999-06), p.67–p.72.

In other words, correlation matrix R, inverse matrix $R^{-1}$ thereof, and the correlation component of the replica signal U(t–T2) of user PS2 with reception signal vector X(t) can be expressed as below.

$$R = \begin{pmatrix} E[D*(t)D(t)] & E[D*(t)U(t-T2)] \\ E[U*(t-T2)D(t)] & E[D*(t-T2)U(t-T2)] \end{pmatrix}$$

$$R^{-1} = \begin{pmatrix} A & B \\ C & D \end{pmatrix}$$

$$r12 = E[U^*(t-T2)x1(t)]$$

$$r22 = E[U^*(t-T2)x2(t)]$$

$$r32 = E[U^*(t-T2)x3(t)]$$

$$r42 = E[U^*(t-T2)x4(t)]$$

Therefore, using inverse matrix $R^{-1}$ of correlation matrix R and the reception correlation vector, reception response vector HD of the desired wave can be obtained in the following manner.

$$h12 = Ar11 + Br12$$

$$h21 = Ar21 + Br22$$

$$h31 = Ar31 + Br32$$

$$h41 = Ar41 + Br42$$

Thus, according to the configuration of radio apparatus 1000 as shown in FIG. 1, reception response vector HD of the desired wave can be estimated. In addition, the weight vector for the downlink (for transmission) can be estimated from estimated reception response vector $H_D$ of the desired wave.

Figure 3:
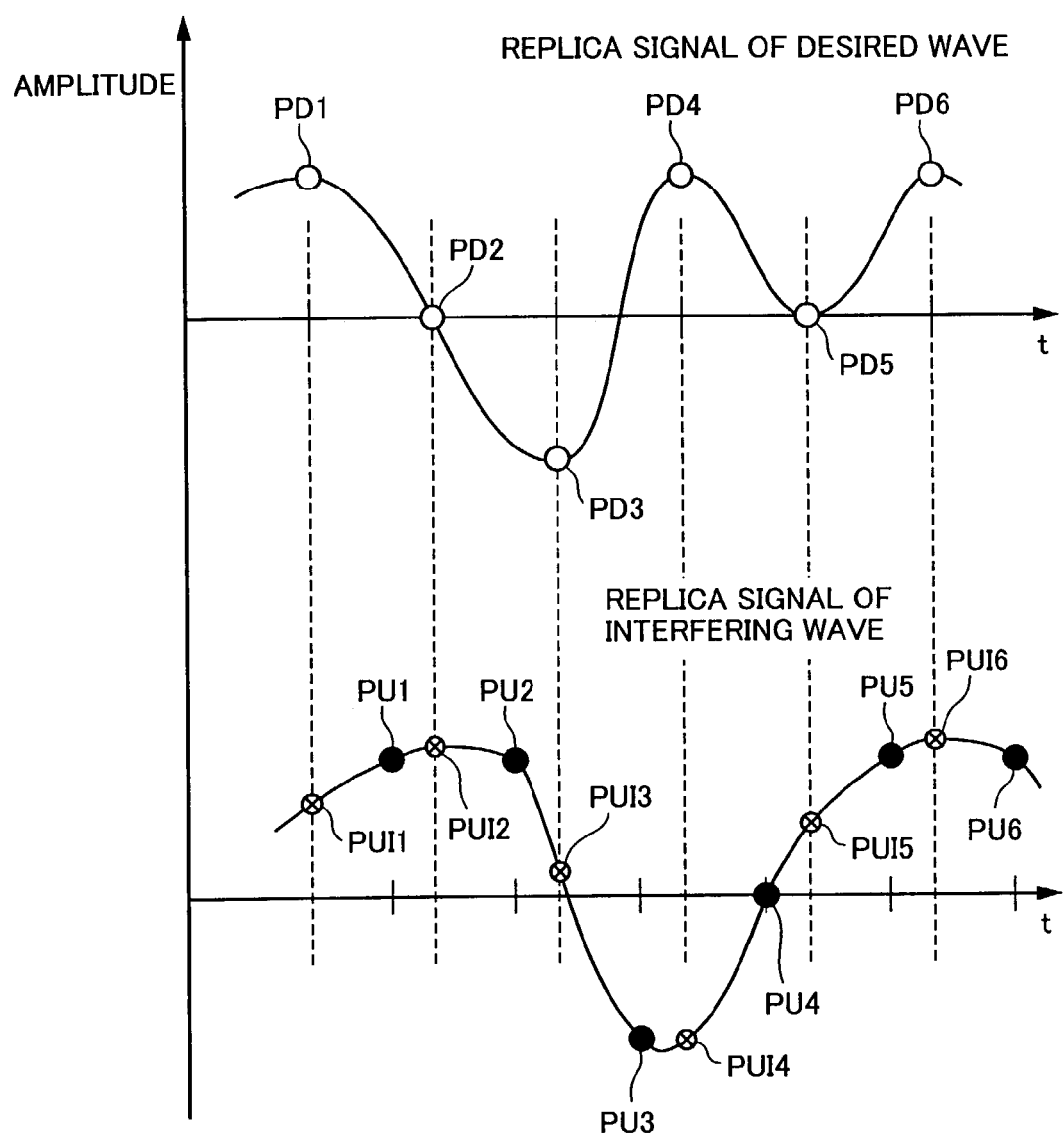
FIG. 3 is a diagram illustrating a timing of signal processing when radio apparatus 1000 operates.

FIG. 3 illustrates a timing of signal processing when radio apparatus 1000 shown in FIG. 1 operates, based on the description above.

In FIG. 3, circles PD1 to PD6 represent the replica signal of the desired wave, that is, the output from remodulation circuit 32.1 in FIG. 1, while solid circles PU1 to PU6 represent the replica signal of the interfering wave, that is, an output from remodulation circuit 32.2 in FIG. 1.

As described above, generally, the incoming timings of the desired wave and the interfering wave do not match. Therefore, generally, the sampling timing for signal processing for the desired wave in reception portion SR1 does not match that for the interfering wave in reception portion SR2.

Therefore, the output of remodulation circuit 32.2 is provided to timing adjustment circuit 36.1 after passing through filtering circuit 34.2. The replica signal of the interfering wave provided from timing adjustment circuit 36.1 to reception response vector calculator 24.1 for an estimate operation of the reception response vector will attain the level of signal points PUI1 to PUI6.

Accordingly, with the configuration as shown in FIG. 1, it is true that reception response vector HD of the desired wave can be estimated, but the configuration is unsatisfactory with regard to the following points.

First, for both of desired wave D(t) and interfering wave U(t–T2), the replica signal needs to be remodulated after demodulation, and further to experience filtering process and timing adjustment process.

In other words, the configuration of radio apparatus 1000 in FIG. 1 for estimating the weight in transmission by estimating fluctuation over time of the response vector is insufficient in that an amount of calculation is significant, the circuit configuration is complicated, and further, the circuit scale is too large.

In addition, essentially, since a signal other than a signal section of the interfering user (a ramp portion positioned at the beginning of a frame, for example) does not have its data demodulated, the replica signal cannot be generated. That is, estimate accuracy of the response vector tends to be deteriorated for the signal section which is not subjected to demodulation process, which is unsatisfactory.

(Configuration in which Replica Signal of Interfering Wave is Directly Generated from Reception Signal)

Therefore, in the following, a configuration of a radio apparatus 2000 which can estimate reception response vector $H_D$ of the desired wave with a simpler circuit configuration will be described.

Figure 4:
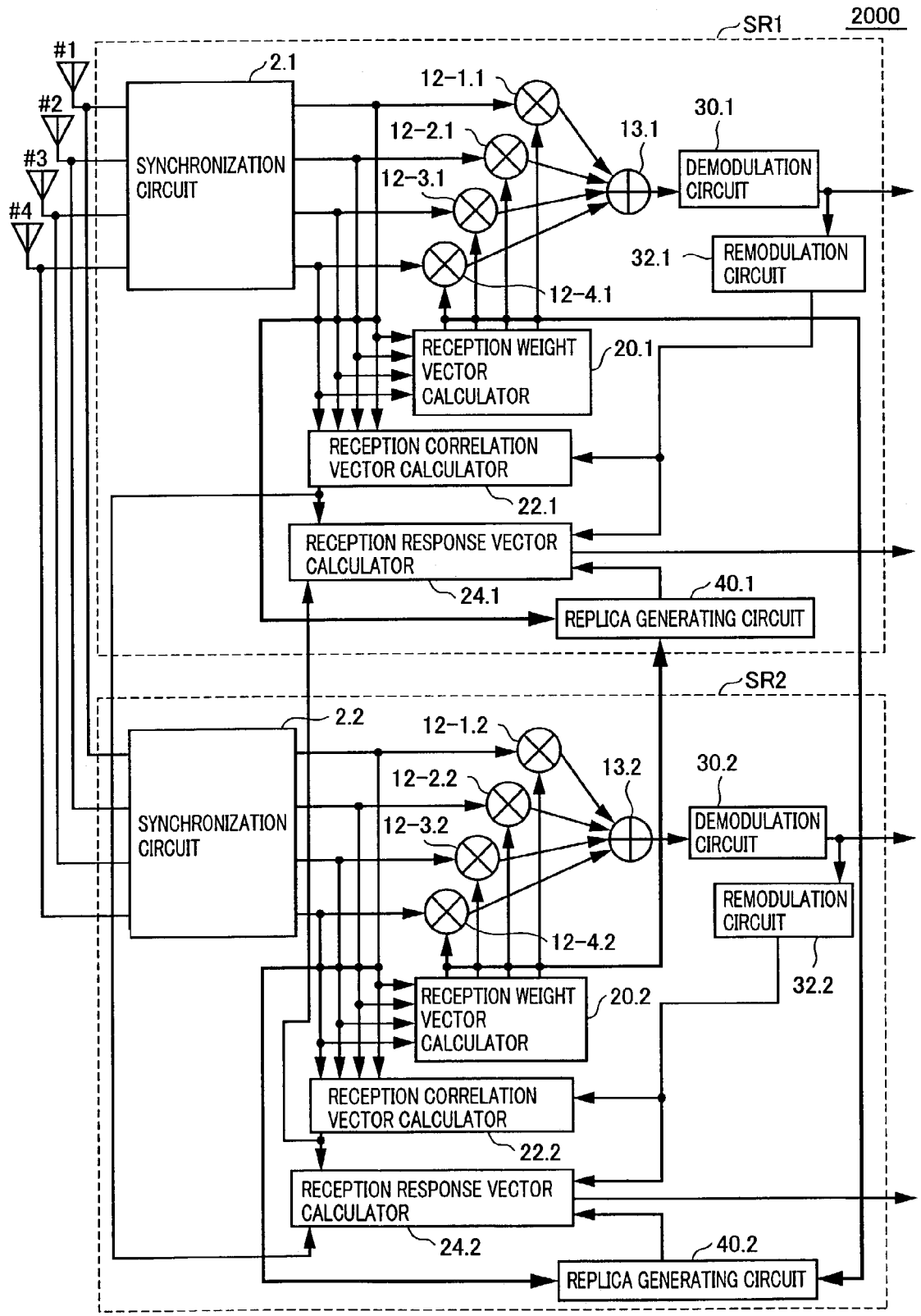
FIG. 4 is a schematic block diagram showing a configuration of a radio apparatus (a radio base station) 2000.

FIG. 4 is a schematic block diagram showing the configuration of radio apparatus (radio base station) 2000 for a PDMA base station, estimating the weight in transmission by directly generating the replica signal of the interfering wave from the reception signal to estimate fluctuation over time of the response vector.

The configuration of radio apparatus 2000 shown in FIG. 4 is different from that of radio apparatus 1000 shown in FIG. 1 in the following points.

First, radio apparatus 2000 includes a replica generating circuit 40.1 corresponding to reception portion SR1, and a replica generating circuit 40.2 corresponding to reception portion SR2, instead of filtering circuits 34.1, 34.2 and timing adjustment circuits 36.1, 36.2.

As described in detail later, replica generating circuit 40.1 receives reception signals x1(t), x2(t), x3(t), x4(t) from synchronization circuit 2.1, and multiplies those reception signals by elements of the reception weight vectors for the interfering wave from reception weight vector calculator 20.2 in reception portion SR2 respectively, to generate replica signal U(t−T2) of the interfering wave. Replica generating circuit 40.2 in reception portion SR2 basically operates in a manner similar to replica generating circuit 40.1.

[Operation of Replica Generating Circuit 40.1]

Each element of reception signal vector X(t) sampled at the sampling timing for the signal of the desired user is expressed in the following equations.

$$x1(t)=h11D(t)+h12U(t-T2)+n1(t)$$

$$x2(t)=h21D(t)+h22U(t-T2)+n2(t)$$

$$x3(t)=h31D(t)+h32U(t-T2)+n3(t)$$

$$x4(t)=h41D(t)+h42U(t-T2)+n4(t)$$

Here, an inner product y(t) of a weight vector $W_U$=[wu1, wu2, wu3, wu4] output from reception weight vector calculator 20.2 in order to extract an interfering user signal in reception portion SR2 and reception signal vector X(t) is as follows.

$$\begin{aligned}y(t) &= wu1x1(t) + wu2x2(t) + wu3x3(t) + wu4x4(t) \\ &= (wu1h11 + wu2h21 + wu3h31 + wu4h41)D(t) + \\ &\quad (wu1h12 + wu2h22 + wu3h32 + wu4h42)U(t-T2) + \\ &\quad (wu1n1(t) + wu2n2(t) + wu3n3(t) + wu4n4(t))\end{aligned}$$

$$Wu=[wu1, wu2, wu3, wu4]^T$$

Weight vector $W_U$ for extracting the interfering user signal is provided for eliminating a desired user signal. Further, if the SN ratio is sufficiently high, following equations are established because a noise component is negligible.

$$(wu1h11+wu2h21+wu3h31+wu4h41)=0$$

$$(wu1h12+wu2h22+wu3h32+wu4h42)=1$$

$$(wu1n1(t)+wu2n2(t)+wu3n3(t)+wu4n4(t)) \approx 0$$

Eventually, inner product y(t) is obtained as follows.

$$y(t)=U(t-T2)$$

In other words, if the inner product y(t) is calculated as required in replica generating circuit 40.1, replica signal U(t−T2) of the interfering user signal can be generated.

Here, unlike the configuration shown in FIG. 1, as the replica signal can be generated without filtering process or the like, an amount of signal processing can be reduced significantly. In addition, since the replica signal of the interfering user can be reproduced even in the section where demodulation data is not present, more time is allowed for correlation processing, and estimate accuracy of a transmission weight can be improved.

[Configuration of Transmission Portion]

In the following, a configuration will be described, in which the transmission weight in transmission is estimated based on the reception response vector estimated in reception portion SR1 shown in FIG. 4.

Figure 5:
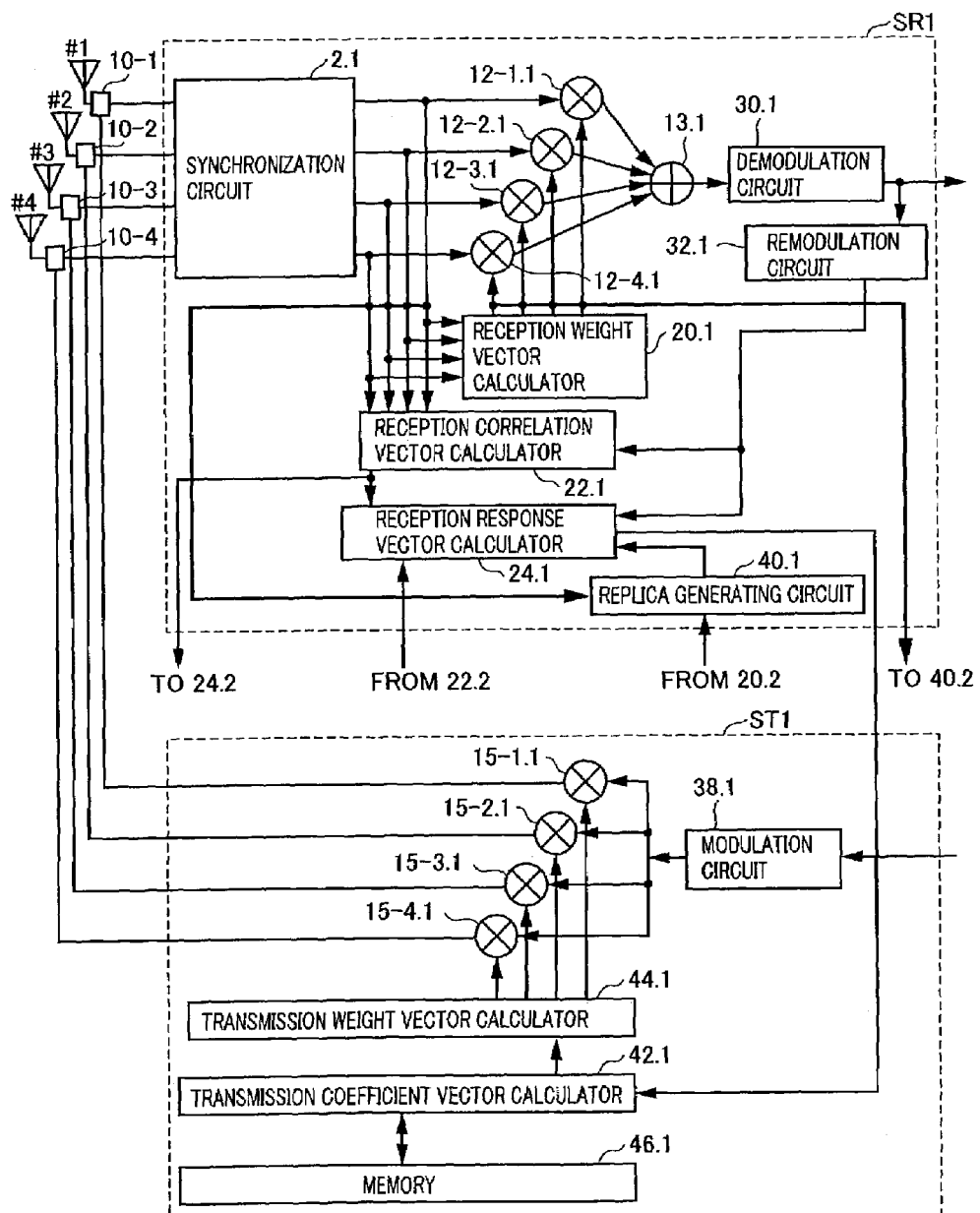
FIG. 5 is a schematic block diagram illustrating a configuration of a transmission portion ST1 corresponding to a reception portion SR1.
Figure 6:
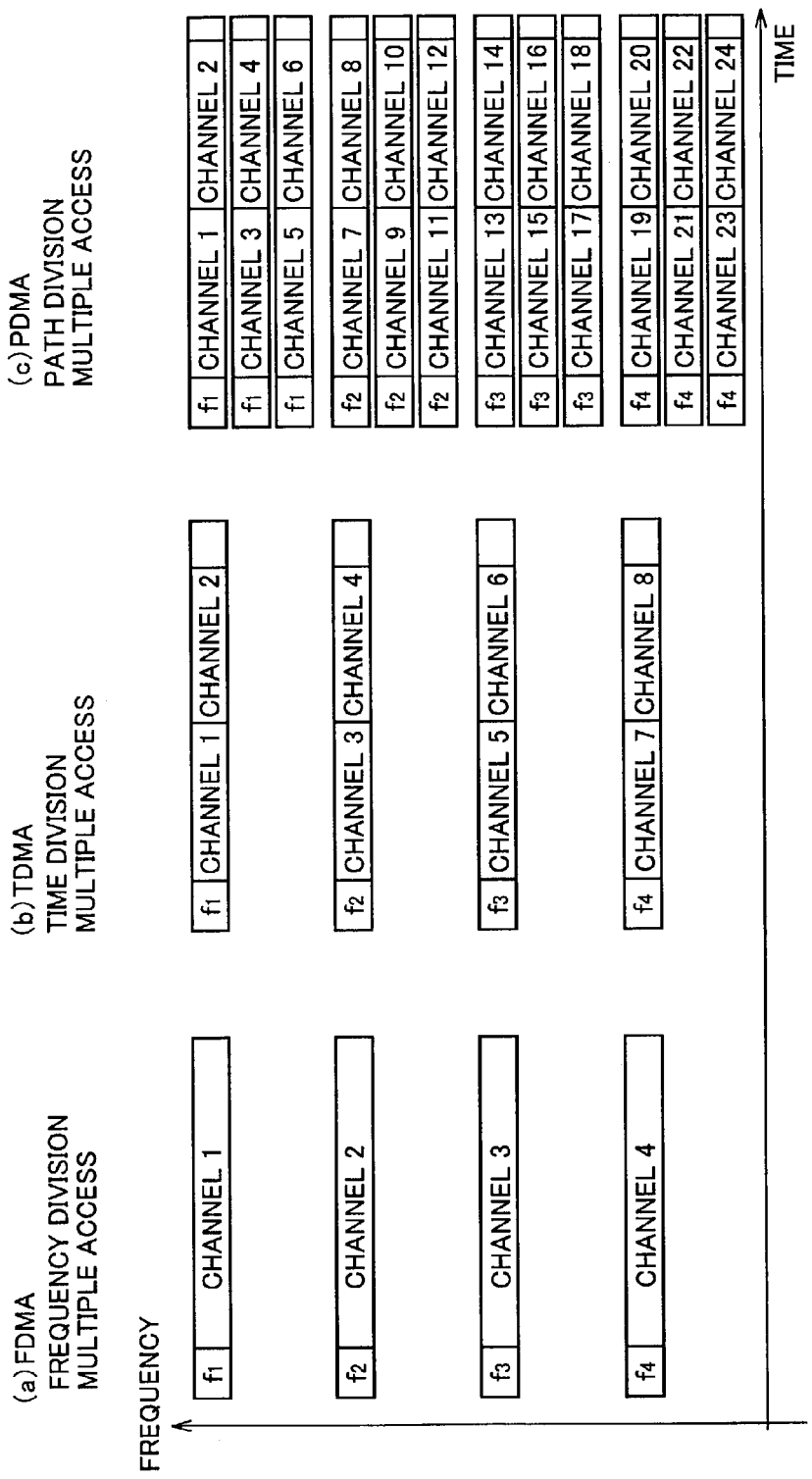
FIG. 6 shows channel arrangements in a variety of communication systems, that is, frequency division multiple access, time division multiple access, and PDMA.
Figure 7:
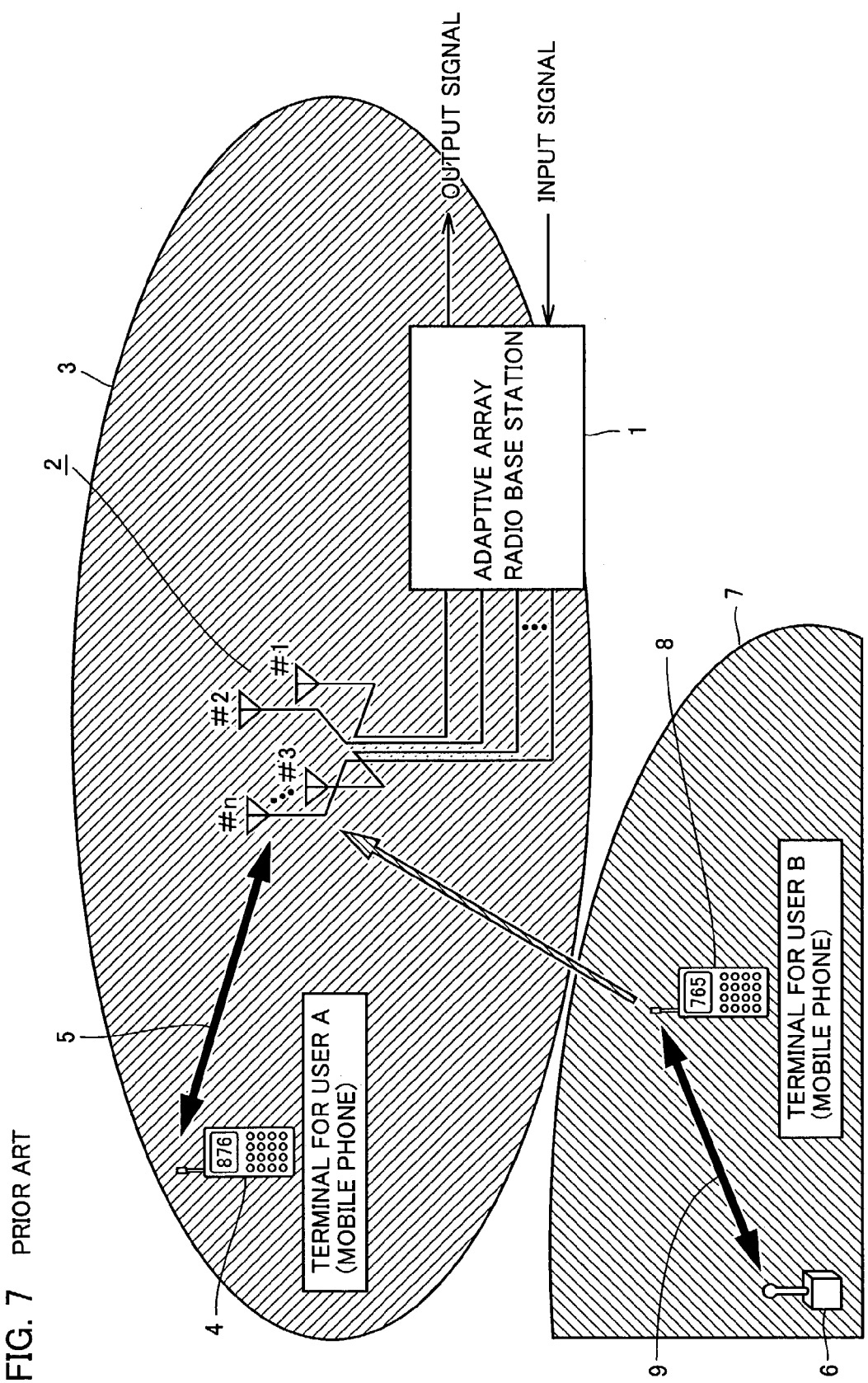
FIG. 7 is a schematic diagram conceptually showing an operation principle of an adaptive array radio base station.
Figure 8:
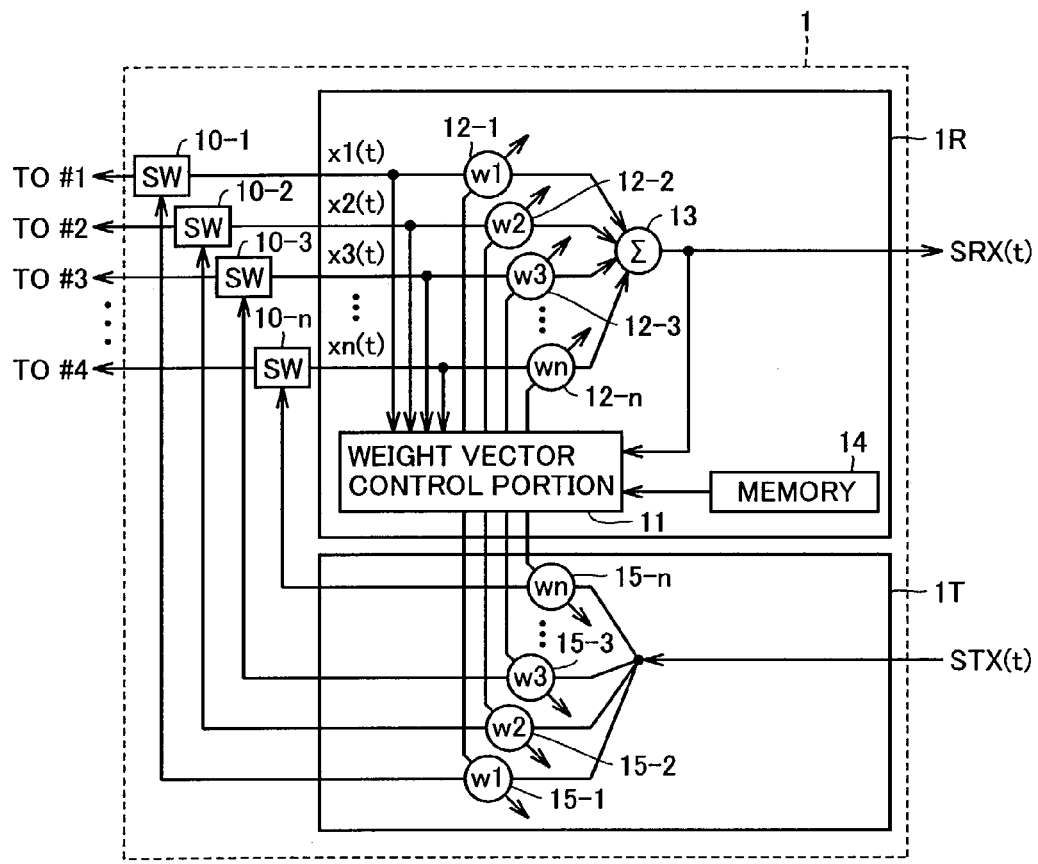
FIG. 8 is a schematic block diagram showing a configuration of adaptive array radio base station 1.
Figure 10:
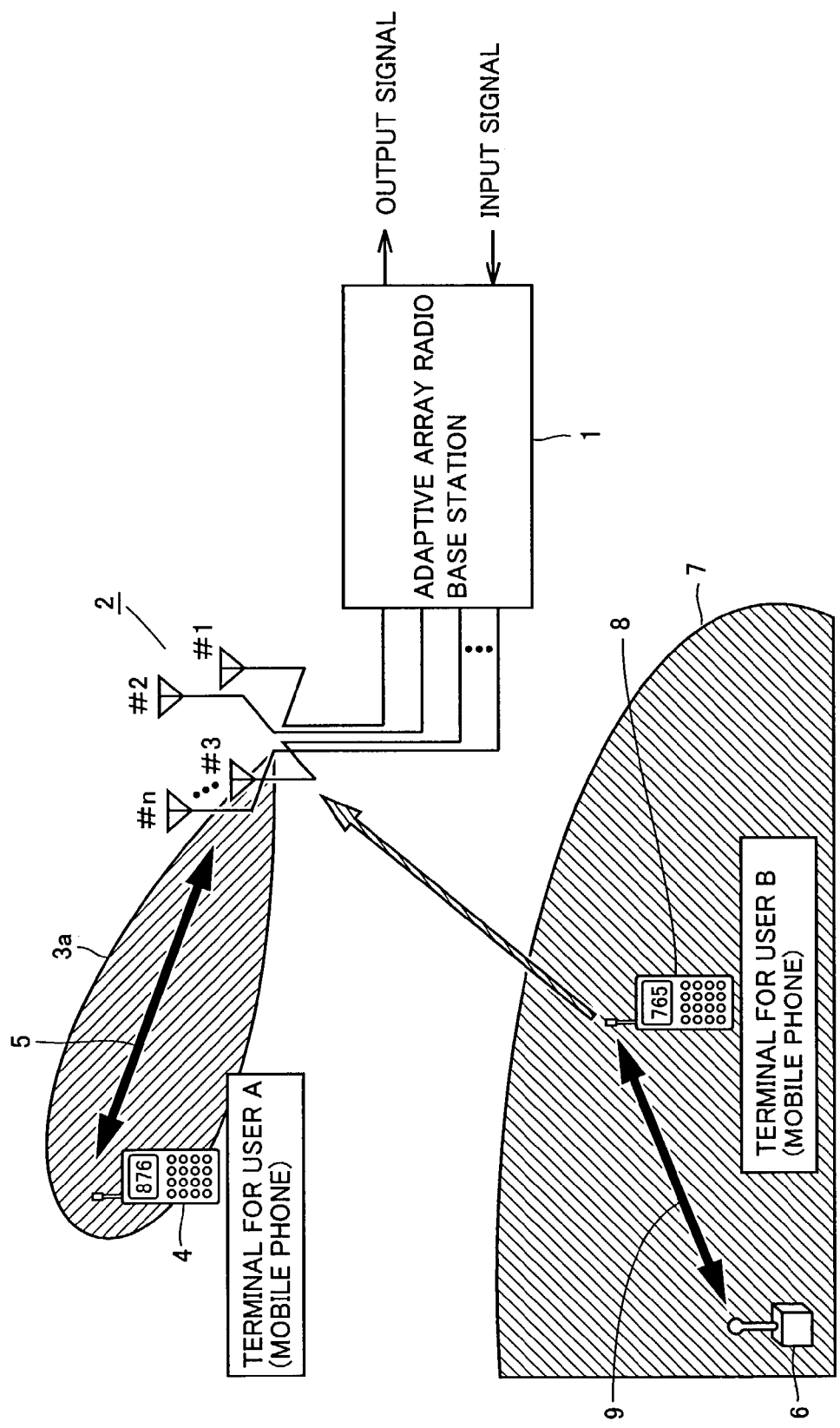
FIG. 10 visualizes communication of the radio wave signal between user A and adaptive array radio base station 1.

FIG. 5 is a schematic block diagram illustrating a configuration of a transmission portion ST1 corresponding to reception portion SR1.

Referring to FIG. 5, transmission portion ST1 includes a transmission coefficient vector calculator 42.1 obtaining a transmission coefficient vector by estimating a propagation path in transmission, that is, estimating an assumed reception response vector at a transmission time point, upon receiving reception response vector $H_D$ calculated in reception response vector calculator 24.1; a memory 46.1 communicating data with transmission coefficient vector calculator 42.1, and storing and holding data; a transmission weight vector calculator 44.1 calculating a transmission weight vector based on an estimated result of transmission coefficient vector calculator 42.1; and multipliers 15-1.1, 15-2.1, 15-3.1, 15-4.1 receiving a transmission signal modulated by modulation circuit 38.1 at one inputs, and having weight coefficients wtx11, wtx21, wtx31, wtx41 applied to the other inputs from transmission weight vector calculator 44.1, respectively. Outputs from multipliers 15-1.1, 15-2.1, 15-3.1, 15-4.1 are given to antennas #1 to #4 via switches 10-1 to 10-4.

(Estimation of Transmission Coefficient Vector)

Thus, the reception response vector with respect to the desired user is obtained from each signal in the uplink, and based on the result, the reception response vector for the downlink at the time point of transmission is estimated with regression calculation or the like.

(Determination of Transmission Weight Vector)

When an estimate value for the reception response vector at the time of transmission is obtained as described above, the transmission weight vector can be obtained using either of three methods in the following.

i) Method by Orthogonalization

A weight vector $W^{(1)}(i)=[wtx_{11}, wtx_{12}, wtx_{13}, wtx_{14}]$ at time t=iT (i: natural number, T: unit time interval) of user PS1 is considered. In order to direct null to user PS2, following conditions are to be satisfied.

Assume the propagation path (reception response vector) predicted for user PS2 as $V^{(2)}(i)=[h_1^{'(2)}(i), h_2^{'(2)}(i), h_3^{'(2)}(i), h_4^{'(2)}(i)]$. Here $h_p^{'(q)}(i)$ is a predicted value of the reception coefficient vector for the pth antenna for the qth user with respect to time i. Similarly, assume that propagation path $V^{(1)}(i)$ is predicted for user PS1 as well.

Here, $W^{(1)}(i)$ is determined such that a relation of $W^{(1)}(i)^T V^{(2)}(i)=0$ is attained. As constraints, following conditions, that is, c1) and c2), are imposed.

c1) $W^{(1)}(i)^T V^{(1)}(i)=g$ (a constant value)

c2) $\|W^{(1)}(i)\|$ is minimized.

Condition c2) is comparable to minimizing a transmission power.

ii) Method Using Spurious Correlation Matrix

Here, the adaptive array consists of some antenna elements, and a portion controlling each element weight value, as described above. Generally, when the input vector of the antenna is represented as X(t), and the weight vector is represented as W, an optimal weight $W_{opt}$ will be given in the following equation (Wiener solution), if the weight vector is controlled so as to minimize mean square error between an output $Y(t)=W^T X(t)$ and a reference signal d(t) (MMSE standard: minimum mean square error standard).

$$W_{opt}=R_{xx}^{-1} r_{xd} \qquad (16)$$

Here, the following equations have to be satisfied.

$$R_{xx}=E[x^*(t)x^T(t)] \quad (17)$$

$$r_{xd}=E[x^*(t)d(t)] \quad (18)$$

Here, $Y^T$ represents transpose of Y, Y* represents a complex region of Y, and E[Y] represents the ensemble average. Using the weight value, the adaptive array generates an array pattern so as to suppress an unnecessary interfering wave.

Meanwhile, in a method using spurious correlation matrix, equation (16) in the above is calculated with spurious correlation matrix described below.

That is, a weight vector $W^{(k)}(i)$ for user k is calculated with an estimated complex reception signal coefficient $h'^{(k)}_n(i)$. When an array response vector for the kth user is represented as $V^{(k)}(i)$, the weight vector can be obtained in the following manner.

$$V^{(k)}(i) = [h_1'^{(k)}(i), h_2'^{(k)}(i), \ldots, h_N'^{(k)}(i)]^T \quad (19)$$

Here, an autocorrelation matrix $R_{xx}(i)$ of an assumed reception signal at t=iT is expressed in the following equation, using $V^{(k)}(i)$.

$$R_{xx}(i) = \sum_{k=1}^{K} V^{(k)*}(i)V^{(k)T}(i) + NI \quad (20)$$

Here, N is an assumed noise term added so that $R_{xx}(i)$ is regular. For example, $N=1.0\times10^{-5}$ in the calculation in the present invention.

A correlation vector $r_{xd}(i)$ of the reception signal with the reference signal is expressed in the following equation.

$$r_{xd}(i)=V^{(k)*}(i) \quad (21)$$

Therefore, the weight for the downlink at time t=iT can be obtained with equations (16), (20), and (21).

The inverse matrix of equation (20) can optimally be calculated for user k with a lemma of the inverse matrix. In the case for two users, in particular, simple equations in the following can calculate the weight.

$$W^{(1)}(i)=\rho_{22}+N)V^{(1)*}(i)-\rho_{12}V^{(2)*}(i) \quad (22)$$

$$W^{(2)}(i)=\rho_{11}+N)V^{(2)*}(i)-\rho_{21}V^{(1)*}(i) \quad (23)$$

$$\rho_{ij}=V^{(i)H}(i)V^{(j)}(i)$$

A method for calculating a weight vector when the autocorrelation matrix is given in such a manner is described in the following references: T. Ohgane, Y. Ogawa, and K. Itoh, Proc. VTC '97, vol. 2, pp.725–729, May, 1997; or, Tanaka, Ohgane, Ogawa, Itoh, IEICE Technical Report, vol. RCS98-11 7, pp.103–108, October 1998, for example.

iii) Method of Directing Beam to User PS1

When attention is paid only to directing a beam to user PS1, the following equation has only to be satisfied.

$$W^{(1)}(i)=V^{(1)}(i)^*$$

When the weight vector in transmission is determined for transmission using any method as described above, and if a dynamic Raleigh propagation path, for example, with spread angle is assumed, deterioration with regard to the error rate in the downlink generated due to the time difference between the uplink and the downlink also in the TDD/PDMA system can be suppressed.

In the above description, a configuration in which the transmission weight vector in transmission is indirectly estimated by estimating the reception response vector. Application of the estimated reception response vector, however, is not limited to such an example.

For example, when the reception response vector is estimated, a reception power of the desired wave can be calculated. Therefore, an amplitude of the transmission power can be controlled in accordance with the reception power. In other words, by controlling the transmission power in accordance with a distance from the base station to the user, interference with another base station can be reduced.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A radio apparatus (2000) varying antenna directivity in real time, and transmitting and receiving signals to and from a plurality of terminals, comprising:
    a plurality of antennas (#1 to #4) arranged in a discrete manner;
    a first reception circuit (SR1) receiving signals from said plurality of antennas, and separating a signal from a first terminal among the signals from said plurality of terminals; and
    a second reception circuit (SR2) receiving signals from said plurality of antennas, and separating a signal from a second terminal among the signals from said plurality of terminals; wherein
    said first reception circuit
    i) separates the signal from said first terminal, based on the signals from said plurality of antennas in receiving a reception signal,
    ii) generates a first replica signal based on the separated signal from said first terminal, and calculates a first reception correlation vector with respect to the signal from said first terminal, in accordance with said first replica signal and the signals from said plurality of antennas in receiving said reception signal,
    iii) generates a second replica signal corresponding to the signal from said second terminal with the signals from said plurality of antennas, based on separation control information for separating the signal from said second terminal in said second reception circuit in receiving said reception signal, and
    iv) estimates a reception response vector with respect to the signal from said first terminal, based on a second reception correlation vector with respect to the signal from said second terminal, said first reception correlation vector, and a correlation matrix calculated from said first and second replica signals.

2. The radio apparatus according to claim 1, wherein the signals transmitted and received to and from said plurality of terminals are signals subjected to time division multiplexing.

3. The radio apparatus according to claim 1, wherein said second reception circuit includes
    a reception signal separation circuit (20.2) generating a weight vector based on the signals from said plurality of antennas, and separating the signal from said second terminal in receiving the reception signal, and a reception correlation vector calculation circuit (22.2) calculating, in receiving said reception signal, said second reception correlation vector, in accordance with a third replica signal, generated based on an output of said reception signal separation circuit, and the signals from said plurality of antennas, and said reception signal separation circuit provides said weight vector to said first reception circuit as said separation control information.

4. The radio apparatus according to claim 3, further comprising a transmission circuit (ST1) sharing said plurality of antennas with said first and second reception circuits in transmitting and receiving signals, wherein said transmission circuit includes a transmission propagation path estimating circuit (42.1) predicting a propagation path in transmitting a transmission signal, based on an estimated result of said reception response vector calculation circuit, and a transmission directivity control circuit (44.1) updating said antenna directivity in transmitting said transmission signal, based on an estimated result of said transmission propagation path estimating circuit.

5. A radio apparatus (2000) varying antenna directivity in real time, and transmitting and receiving signals to and from a plurality of terminals, comprising:

a plurality of antennas (#1 to #4) arranged in a discrete manner;

a first reception circuit (SR1) receiving signals from said plurality of antennas, and separating a signal from a first terminal among the signals from said plurality of terminals; and a second reception circuit (SR2) receiving signals from said plurality of antennas, and separating a signal from a second terminal among the signals from said plurality of terminals; wherein said first reception circuit includes a first reception signal separation circuit (20.1) generating a first weight vector based on the signals from said plurality of antennas and separating the signal from said first terminal in receiving a reception signal, a first reception correlation vector calculation circuit (22.1) calculating, in receiving said reception signal, a first reception correlation vector with respect to the signal from said first terminal, in accordance with a first replica signal, generated based on an output of said first reception signal separation circuit, and the signals from said plurality of antennas, a first replica signal generating circuit (40.1) generating a second replica signal corresponding to the signal from said second terminal, based on separation control information in said second reception circuit, with respect to the signals from said plurality of antennas in receiving said reception signal, and a reception response vector calculation circuit (24.1) estimating a reception response vector with respect to the signal from said first terminal, based on a second reception correlation vector with respect to the signal from said second terminal provided from said second reception circuit, said first reception correlation vector, and a correlation matrix calculated from said first and second replica signals.

6. The radio apparatus according to claim 5, wherein the signals transmitted and received to and from said plurality of terminals are signals subjected to time division multiplexing.

7. The radio apparatus according to claim 5, wherein said second reception circuit includes a second reception signal separation circuit (20.2) generating a second weight vector based on the signals from said plurality of antennas, and separating the signal from said second terminal in receiving the reception signal, and a second reception correlation vector calculation circuit (22.2) calculating, in receiving said reception signal, said second reception correlation vector, in accordance with a third replica signal, generated based on an output of said second reception signal separation circuit, and the signals from said plurality of antennas, and said second reception signal separation circuit provides said second weight vector to said first replica signal generating circuit as said separation control information.

8. The radio apparatus according to claim 7, further comprising a transmission circuit (ST1) sharing said plurality of antennas with said first and second reception circuits in transmitting and receiving signals, wherein said transmission circuit includes a transmission propagation path estimating circuit (42.1) predicting a propagation path in transmitting a transmission signal, based on an estimated result of said reception response vector calculation circuit, and a transmission directivity control circuit (44.1) updating said antenna directivity in transmitting said transmission signal, based on an estimated result of said transmission propagation path estimating circuit.

\* \* \* \* \*